United States Patent Office 3,219,618
Patented Nov. 23, 1965

3,219,618
COATING COMPOSITIONS CONTAINING BUTYL RUBBER AND PROCESS OF APPLYING SAME
Paul Freitag, 29 Blvd. Cotte, Enghien-les-Bains, France
No Drawing. Filed May 20, 1958, Ser. No. 736,473
Claims priority, application France, May 28, 1957, 739,612, Patent 1,177,033
19 Claims. (Cl. 260—33.6)

The present invention relates to a painting and coating composition which is particularly useful for protection against corrosion.

Painting and coating compositions as they have been used heretofore for protection against corrosion, and especially for protection against corrosion by chemically corrosive agents, have a number of disadvantages which limit their utilization. Usually, coatings produced with such compositions are rather thin and often insufficient to completely cover the roughness of the iron and other surfaces generally employed in industry and for construction purposes. Furthermore, such coatings deteriorate and age rather rapidly and tend to crack either due to oxidation of the paint itself or to decomposition or evaporation of the plasticizer used. Although compositions of plastic materials yield more satisfactory coatings with respect to the thickness and covering power of the resulting layers, such compositions can be applied to movable objects only because their use requires subsequent heat or other treatment. Therefore, such compositions generally must be used at a place where the necessary equipment for such a treatment is readily obtainable.

It is one object of the present invention to provide a new and valuable painting and coating composition useful for protection against corrosion.

Other objects of the present invention and advantageous features thereof will become apparent as the description proceeds.

In principle, the painting and coating composition according to the present invention comprises, as essential ingredient, butyl rubber which may be used as such or in mixture with other resins and plastics for which it serves as an insert and stable plasticizer. The term "butyl rubber" as used in this specification and in the appended claims will be understood to refer to a synthetic elastomeric material produced by copolymerization of isobutene (approx. 98%) with a small proportion (approx. 2%) of isoprene or butadiene.

The proportions of butyl rubber on the one hand, and resins and plastics, on the other hand, in the resulting composition may vary depending on the desired plasticity of the resulting coating.

In addition to said binding agent, pigments, fillers, and solvents present in such painting and coating compositions according to the present invention, they must contain at least one vulcanizing agent. A vulcanization accelerator is then added when such a composition is used.

If the composition is used as a paint, the nature of the pigments employed may vary depending upon whether it is used as a primer coating or an undercoating, as intermediate coatings, or as finish coatings.

A primer composition according to the present invention must assure adhesion of the coating to the material to be coated. If said material is iron, it must have a rust-preventing effect. The finish coating must provide the desired appearance of the coated material and must be fully resistant against the action of the atmosphere. The intermediate coating must act as a layer, firmly binding the two above mentioned layers and must complete the covering or hiding power of the resulting multi-layer coating.

The new painting and coating composition according to the present invention may be applied to all kinds of materials where a protective coating is desired, for instance, to wood, stone, metal objects, and other materials. It may be applied to such materials either as a paint by means of a brush, a roller, by spraying, or in any other suitable manner, or as a coating by means of a putty knife or by other suitable means.

The painting and coating composition according to the present invention has the advantage of yielding multi-layer protective coatings which are chemically inert. Furthermore, the coatings remain plastic and have the same properties as a single layer coating due to the intimate bonding of the different layers.

According to the present invention, the different layers of the coatings may contain different types of pigments depending upon their purpose. For instance, the primer layer may contain anticorrosive pigments when applied to iron while the finish may contain pigments which give the coated material the desired appearance.

When the primer layer is applied to metallic surfaces and especially to iron surfaces it should contain pigments which usually are used as rust-preventing agents, such as red lead, zinc chromate, and the like. The use of red lead is particularly advantageous as anticorrosive agent since it is also an agent which activates vulcanization of the butyl rubber.

The painting and coating compositions may contain, in accordance with their intended use as primer, intermediate layer, or finish, pigments as they are ordinarily used for such a purpose in paints, provided they are chemically inert and stable in chemical media. Such pigments are, for instance, mineral pigments such as titanium dioxide, red iron oxide, yellow iron oxide, black iron oxide, graphite, red cadmium sulfiide, and the like, or organic pigments, such as the pigments sold under the trademarks "Phthalocyanine Blue," "Hansa Yellow," "Phthalocyanine Green," "Benzidine Yellow," "Rubber Red PBD," "Rubber Red ZBD," "Heliogen Red," and others.

As fillers there may be used compounds such as talc, barium sulfate, and the like, or specific fillers which are able to improve the mechanical properties of butyl rubber, for instance, carbon black, such as the product sold under the trademark "Philblack," or fillers of the silica type as used in rubber compounds, such as compounds sold under the trademarks "Silteg AS 7," "Hi-Sil," and others (asbestos, glass fibres, vegetal fibres).

Painting and coating compositions according to the present invention have a higher covering or hiding power than compositons used heretofore inasmuch as they yield layers having a thickness of about $100\mu$ which are considreably thicker than layers obtained from the usual painting compositions. When producing for instance, three layers, a coating of a total thickness of about $300\mu$ which has a high resistance against chemical agents, a remarkable plasticity, and a prolonged stability at a temperature range between about $-20°$ C. and about $+150°$ C., which is shock-resistant, which does not flake off, and the exterior surface of which does not deteriorate.

As the painting and coating compositions according to the present invention have outstanding chemical and physical properties, form excellent protective coatings, adhere very well to the coated objects, and can be applied to objects of all types of material in a simple manner, they have found wide and extensive application for many purposes.

The following examples serve to illustrate the present invention without, however, limiting the same thereto.

*Example 1.—Preparation of the binding agent*

(a) *Solution of butyl rubber (Solution No. 1).*—25 kg. of butyl rubber are cut in pieces and milled in a powerful masticator. 5 kg. of aromatic white-spirit are added thereto in order to cause swelling and to dissolve the butyl rubber.

(b) *Solution of cyclohexanone AW2 resin (Solution No. 2).*—70 kg. of the cyclohexanone AW2 resin and 30 kg. of solvent naphtha are mixed in a steam-heated vessel. The mixture is stirred at about 70°C. until the resin is completely dissolved.

The term "cyclohexanone AW2" resin as used in Example 1b and hereinafter in the specification and claims, refers to synthetic resins which are produced by treating a mixture of cyclohexanone and methyl cyclohexanone with alkali hydroxide, with sulfuric acid, or with zinc chloride and hydrochloric acid. These cyclohexanone resins are well compatible with butyl rubber and have a hardening effect thereon, thus yielding an elastic and plastic coating which retains its elasticity and plasticity for a long period of time. The manufacture of the cyclohexanone AW2 resin as carried out by the I. G. Farbenfabriken A.G., Ludwigshafen/Rhein, Germany, as described, for instance, in BIOS report No. 73. Further data on said cyclohexanone AW2 resin are given by A. Hill in "Modern Plastics," vol. 25, #12, pages 119/120 (1948). See also "The Chemistry of Synthetic Resins" by Carleton Ellis (1935).

*Example 2.—Preparation of pigment-containing composition according to the present invention*

(a) *Primer composition directly applicable to iron:*

20 kg. of Solution No. 1 obtained according to Example 1(a),
14 kg. of Solution No. 2 made according to Example 1(b),
50 kg. of powdered red lead of non-setting quality,
0.06 kg. of "Philblack" carbon black,
15 kg. of talc,
0.075 kg. of twice sublimated sulfur,
0.2 kg. of lead peroxide, and
0.25 kg. of active zinc oxide are mixed in a masticator until a homogenous paste is obtained. The resulting paste is ground, for example, in a three-roller type grinder.

(b) *Composition applicable as intermediate layer:*

24 kg. of Solution No. 1, obtained as described in Example 1(a),
17 kg. of Solution No. 2, obtained according to Example 1(b), as pigments, 2 kg. of titanium dioxide of the rutile type,
20 kg. of black iron oxide, and
2 kg. of carbon black "Philblack,"

as fillers, 8 kg. of talc,
14 kg. of precipitated barium sulfate, and
1 kg. of a special silica (Silteg AS 7), and as vulcanizing agents and activators, 0.09 kg. of twice-sublimated sulfur,
0.24 kg. of lead peroxide, and
0.3 kg. of active zinc oxide are intimately mixed in a masticator and ground in a mill. The resulting paste is diluted with 12.5 kg. of an aromatic white-spirit solvent.

(c) *Composition applicable as finish coating (grey colored):*

36.5 kg. of Solution No. 1, obtained according to Example 1(a),
13 kg. of Solution No. 2, prepared according to Example 1(b), as pigments, 7 kg. of titanium oxide of the rutile type, and
3 kg. of black iron oxide, as fillers, 8 kg. of talc,
10 kg. of precipitated barium sulfate,
2 kg. of silica (Silteg AS 7), and
1 kg. of "Philblack" carbon black, and as vulcanizing agents and activators, 0.14 kg. of twice sublimated sulfur,
0.36 kg. of lead peroxide, and
0.45 kg. of active zinc oxide are mixed intimately in a masticator and ground in a mill. The resulting paste is diluted with 19 kg. of an aromatic white-spirit solvent.

(d) *Composition applicable as finish coating (aluminum colored):*

56 kg. of Solution No. 1, obtained according to Example 1(a),
20 kg. of Solution No. 2, prepared as described in Example 1(b),
15 kg. of an aluminum paste sold under the trademark "Alpate" (a lamellar aluminum pigment coated with stearic acid, in an aliphatic solvent),
0.56 kg. of benzothiazole disulfide, and
9 kg. of an aromatic white-spirit solvent are mixed in a mixing device until a homogeneous paste is obtained.

(e) *Composition applicable as finish coating (gray colored):*

58 kg. of Solution No. 1, obtained according to Example 1(a),
11 kg. of titanium dioxide of the rutile type,
0.40 kg. of "Philblack" carbon black,
4 kg. of "Silteg AS 7" silica,
0.58 kg. of lead peroxide,
0.21 kg. of twice-sublimated sulfur, and
0.73 kg. of active zinc oxide are mixed intimately in a masticator and ground, for instance, in a tri-roller mill. The resulting paste is diluted with 25 kg. of an aromatic white-spirit solvent.

The hereinabove described compositions may also be prepared in mixing devices of the "internal mixer" type kneader, mixing rollers, and others, as they are used in rubber compounding. In such mixing devices the butyl rubber is masticated and the desired pigments and fillers are intimately and homogeneously compounded therewith. The resulting paste is then diluted therein with any suitable solvent.

This process permits to improve the qualities of the butyl rubber binder by the addition of special adjuvants, such as the vulcanization accelerators sold under the trademark "Polyac" or peptizing agents or by a heat treatment which may be performed in such a device.

*Example 3.—Preparation of the vulcanization accelerating agent*

20 kg. of Solution No. 1, obtained according to Example 1(a),
21.5 kg. of Solution No. 2, prepared according to Example 1(b)

are introduced into a masticator, and 3 kg. of p-quinone dioxime,
7 kg. of titanium dioxide of the rutile type,
35 kg. of talc, and
8.5 kg. of solvent naphtha are admixed thereto until a homogeneous paste is obtained. Said paste is ground, for instance, in a tri-roller mill, and is finally diluted with 5 kg. of an aromatic white-spirit solvent.

*Example 4.—Painting and coating composition prepared shortly before its use*

Shortly before the compositions of Example 2 are used for painting and coating, they are mixed with the vulcanization accelerating agent of Example 3 in the following proportions:

(a) *Primer composition:*

| | Kilograms |
|---|---|
| Primer composition according to Example 2(a) | 100.0 |
| Vulcanization accelerating agent according to Example 3 | 3.3 |

(b) *Composition applicable as intermediate coating:*

| | Kilograms |
|---|---|
| Composition according to Example 2(b) | 100.0 |
| Vulcanization accelerating agent according to Example 3 | 4.0 |

(c) *Composition applicable as finish coating of gray color:*

| | Kilograms |
|---|---|
| Composition according to Example 2(c) | 100.0 |
| Vulcanization accelerating agent according to Example 3 | 6.1 |

(d) *Composition applicable as finish coating of aluminum color:*

| | Kilograms |
|---|---|
| Composition according to Example 2(d) | 100.0 |
| Vulcanization accelerating agent according to Example 3 | 9.3 |

Vulcanization takes place due to the presence of stearic acid in the "Alpate."

(e) *Composition applicable as finish coating of gray color:*

| | Kilograms |
|---|---|
| Composition according to Example 2(e) | 100.0 |
| Vulcanization accelerating agent according to Example 3 | 9.7 |

The above given mixtures are thoroughly mixed with each other in order to uniformly and homogeneously distribute the vulcanization accelerating agent throughout the composition. The resulting mixtures are stable for more than 24 hours at room temperature without thickening. As stated above, they are applied to the objects to be coated, for instance, by means of a flat brush with long and flexible bristles to a coating of equal thickness without exerting pressure to the brush. After 24 hours, the intermediate coating can be applied to the primer coating and after 24 more hours the finish coating.

It is understood that the compositions described hereinabove are not limited to the ingredients and proportions given. Other pigments as they are conventionally used in painting and coating compositions, provided they are chemically inert and stable, can also be admixed to the various compositions. The primer composition, however, is preferably used with the ingredients given in Example 2(a). Especially suitable pigments as well as fillers to be admixed to the compositions according to the present invention are pigments and fillers as they are conventionally used in rubber compounding in order to improve the mechanical properties of the butyl rubber.

If the surface to be treated requires application of a surface coating, the mixtures given hereinabove may be used but in the form of a highly viscous levelling and filling paste as it can readily be obtained by reducing the amount of the aromatic white-spirit solvent. The resulting paste is then applied to the surface to be levelled and filled, for instance, by means of a putty knife. The thus levelled and filled surface is then coated with the compositions described hereinabove and diluted to such an extent that they can be applied by means of a brush.

As stated hereinabove, the present invention is characterized by the use of butyl rubber as protective coating material and the presence of a solvent and a vulcanizing agent in the painting and coating composition and by the feature that such a composition, if a vulcanization accelerator is admixed thereto shortly before its use, yields a vulcanized butyl rubber coating of excellent protective and/or anti-corrosive properties.

As is evident, only such vulcanizing agents and vulcanization accelerators can be used which cause vulcanization of the butyl rubber at room temperature without heating if the composition is applied to stationary objects which cannot be subjected to a heat treatment. For smaller or movable articles vulcanizing agents and vulcanization accelerators can be employed which effect vulcanization of butyl rubber at elevated temperature. However, such a composition is not the preferred one. On the contrary, all the advantages of the present invention as pointed out hereinabove can be achieved only when using vulcanizing agents and vulcanization accelerators which effect substantial vulcanization of butyl rubber at room temperature within a short period of time, preferably not exceeding about 24 hours, although complete vulcanization may be reached only after several days.

The content of butyl rubber in the compositions according to the present invention may vary. It has been found that a content of butyl rubber of about 3% calculated for solid matter in the composition is the minimum amount yielding proper anticorrosive effects, for instance, in primer coating compositions. Intermediate coating compositions should contain at least about 6% of butyl rubber calculated for solid matter while finish coating compositions should contain not less than 15% of butyl rubber calculated for solid matter. Up to 75% of the solid matter of said finish coating compositions may consist of butyl rubber. The butyl rubber content in the compositions including the solvent is preferably between about 2.5% and about 25%.

The proportion of rubber to resin in the compositions may vary in accordance with the desired plasticity as has been pointed out hereinabove. It was found that a proportion of rubber to resin between about 1:0 and about 1:2.5 yields satisfactory results. The preferred proportion of rubber to resin is between about 1:1 and about 1:2.

Other natural or synthetic resins than cyclohexanone resins used in the examples may be employed, provided they have a hardening effect on butyl rubber and are compatible therewith. Such resins are, for instance, terpene resins (ester-gum, hydrogenated rosin), maleic resins, resins obtained by the cracking of olefins, pure substituted formol-phenol resins, modified abietic formol-phenol resins, and poly-isocyanate resins.

The term "aromatic white-spirit" as used hereinabove in the specification and in the claims annexed hereto refers to a refined petroleum distillate which is also designated as "mineral spirit," "petroleum spirit," "Stoddard solvent," and "ligroin." It conforms to U.S. Bureau of Standards specifications and is widely used as a dry-cleaning solvent and as thinner and solvent in paints, varnishes, and similar products. Its boiling range is between about 140° C. and about 200° C. Other petroleum distillates may also be used, such as kerosene, and the like. Aromatic hydrocarbons, for instance, xylene, solvent naphtha, and turpentine, may also be employed.

In place of talc, barium sulfate, carbon black, and silica as used in the examples, there may be employed other filler and reinforcing materials, such as alumina gel, calcium silicate, kaolin, quartz powder, calcinated clay ("Buca-Clay," "Silene," "Whitetex"), asbestos, mica, alumina, corundum, calcium carbonate, whiting, natural silicates.

The accelerator solution described in Example 3 may contain, in place of p-quinone dioxime, other accelerating agents, such as p-dinitroso benzene ("Polyac"), tetramethyl thiuram disulfide, tetraethyl thiuram disulfide, 2-mercapto benzothiazole, dibenzoyl paraquinone dioxime, tetrachloro-p-benzoquinone, selenium or tellurium diethyl dithiocarbamate, and others.

When "Polyac" is used in the accelerator solution, no lead peroxide is needed in the composition to which said accelerator solution is to be added.

When "Polyac" is added to the composition as hereinabove mentioned after Example 2(e), this addition is made in very small proportion, so that the composition becomes only pre-vulcanized, whereby the tendency of the final coating to flow is reduced and its non-tacking properties are improved. On the other hand, when peptizing agents are added to the composition, as also hereinabove mentioned after Example 2(e), the molecular weight of the butyl-rubber is reduced and the fluidity of the solution is increased.

Instead of incorporating a vulcanizing agent in the butyl rubber containing composition and admixing thereto a vulcanization accelerator before use, the invention can also be put into practice by incorporating the vulcanizing accelerator in the butyl rubber containing composition, whereas the vulcanizing agent is admixed to said composition before use.

The following example serves to illustrate this embodiment of the invention, without, however, limiting the same thereto.

*Example 5.—Preparation of the butyl rubber containing composition*

58 kg. of Solution No. 1, obtained according to Example 1(a),
11 kg. of titanium dioxide of the rutile type,
0.40 kg. of "Philblack" carbon black,
4 kg. of "Silteg AS 7" silica,
0.30 kg. of p-quinone dioxime, and
25 kg. of an aromatic white-spirit solvent are mixed and ground together in a masticator.

*Preparation of a vulcanizing agent solution:*

25 kg. of Solution No. 1, obtained according to Example 1(a),
21.5 kg. of Solution No. 2, obtained according to Example 1(b),
6 kg. of lead peroxide,
7.5 kg. of active zinc oxide,
2 kg. of twice-sublimated sulfur,
7 kg. of titanium dioxide of the rutile type,
22.5 kg. of talc, and
8.5 kg. of solvent naphtha, are mixed together until a homogeneous paste is obtained. This paste is ground and finally diluted with 5 kg. of an aromatic white-spirit solvent.

In order to prepare the painting and coating composition shortly before use, 100 kg. of the butyl rubber containing composition (in which p-quinone dioxime is present as a vulcanization accelerator) are mixed with 9.7 kg. of the vulcanizing agent solution.

Of course, many changes and variations in the components of the painting and coating compositions and their amounts, in the manner in which the components are mixed with each other and the solvent, in the manner in which the compositions, after admixture of the accelerating agent, are applied to the surfaces to be protected against corrosion, and the like may be made by those skilled in the art in accordance with the principles set forth herein and in the claims annexed hereto.

I claim:

1. Anticorrosive, protective painting and coating composition comprising a synthetic elastomeric copolymer of isobutene with approximately 2 percent of a diolefine selected from the group consisting of isoprene and butadiene, a vulcanizing agent capable of reacting with said elastomeric copolymer at room temperature, and a volatile organic solvent for said elastomeric copolymer, the boiling range of said solvent being between about 140° C. and about 200° C., said solvent being chemically inert and causing swelling and dissolution of said elastomeric copolymer, the components of said composition being uniformly and homogeneously distributed therethrough, said composition, on the addition, within about 24 hours before using the composition as paint, of an accelerator for vulcanization of said elastomeric copolymer, said accelerator acting at room temperature, forming a substantially non-tacky, anticorrosive, protective coating on application to surfaces to be protected, the elastomeric copolymer content of said composition being between about 2.5% and about 25% and its total solid content being between about 30% and about 80%.

2. Anticorrosive, protective painting and coating composition comprising a synthetic elastomeric copolymer of isobutene with approximately 2 percent of a diolefine selected from the group consisting of isoprene and butadiene, a pigment, a reinforcing agent, a filler material, a vulcanizing agent capable of reacting with said elastomeric copolymer at room temperature, and a volatile organic solvent for said elastomeric copolymer, the boiling range of said solvent being between about 140° C. and about 200° C., said solvent being chemically inert and causing swelling and dissolution of said elastomeric copolymer, the components of said composition being uniformly and homogeneously distributed therethrough, said composition, on the addition, within about 24 hours before using the composition as paint, of an accelerator for vulcanization of said elastomeric copolymer, said accelerator acting at room temperature, forming a substantially non-tacky, anticorrosive, protective coating on application to surfaces to be protected, the elastomeric copolymer content of said composition being between about 2.5% and about 25% and its total solid content being between about 30% and about 80%.

3. Anticorrosive, protective painting and costing composition comprising a synthetic elastomeric copolymer of isobutene with approximately 2% of a diolefine selected from the group consisting of isoprene and butadiene, a synthetic resinous copolymer of cyclohexanone and methyl cyclohexanone, a vulcanizing agent capable of reacting with said elastomeric copolymer at room temperature, and a volatile organic solvent for said elastomeric copolymer and said resinous copolymer, the boiling range of said solvent being between about 140° C. and about 200° C., said solvent being chemically inert and causing swelling and dissolution of said elastomeric copolymer and the resinous copolymer, the components of said composition being uniformly and homogeneously distributed therethrough, said composition, on the addition, within about 24 hours before using the composition as paint, of an accelerator for vulcanization of said elastomeric copolymer, said accelerator acting at room temperature, forming a substantially non-tacky, anticorrosive, protective coating on application to surface to be protected, the proportion of elastomeric copolymer to resinous copolymer not substantially exceeding a proportion of about 1.0:2.5, the elastomeric copolymer content of said composition being between about 2.5% and about 25% and its total solid content being between about 30% and about 80%.

4. The composition according to claim 1, wherein the solvent is an aromatic white-spirit solvent.

5. The composition according to claim 2, wherein the solvent is an aromatic white-spirit solvent, and the pigment is a pigment selected from the group consisting of chemically inert mineral and organic pigments.

6. An anticorrosive primer coating composition substantially composed of 20 parts by weight of a 25% solution of a synthetic elastomeric copolymer of isobutene with approximately 2% of a diolefine selected from the group consisting of isoprene and butadiene in an aromatic white-spirit solvent,
14 parts by weight of a 70% solution of a synthetic resinous copolymer of cyclohexanone and methyl cyclohexanone in solvent naphtha,
50 parts by weight of non-setting red lead,
15 parts by weight of talc,
0.06 parts by weight of carbon black,
0.075 parts by weight of sulfur,
0.2 parts by weight of lead peroxide, and
0.25 parts by weight of active zinc oxide, said components being intimately mixed with each other and uniformly and homogeneously distributed throughout said composition, said primer coating composition, on admixture of p-benzoquinone dioxime, within about 24 hours before using said primer coating composition, forming a non-tacky, anticorrosive protective primer coating on application to surfaces to be protected.

7. An anticorrosive intermediate coating composition substantially composed of 24 parts by weight of a 25% solution of a synthetic elastomeric copolymer of isobutene with approximately 2 percent of a diolefine selected from the group consisting of isoprene and butadiene in an aromatic white spirit solvent,
17 parts by weight of a 70% solution of a synthetic resinous copolymer of cyclohexanone and methyl cyclohexanone in solvent naphtha,
2 parts by weight of titanium dioxide,
20 parts by weight of black iron oxide,
2 parts by weight of carbon black,
8 parts by weight of talc,
14 parts by weight of barium sulfate,
1 part by weight of activated silica,
0.09 parts by weight of sulfur,
0.24 parts by weight of lead peroxide,
0.3 parts by weight of active zinc oxide, and
12.5 parts by weight of an aromatic white-spirit solvent added as diluent, said components being intimately mixed with each other and uniformly and homogeneously distributed throughout said composition, said intermediate coating composition, on admixture of p-benzoquinone dioxime, within about 24 hours before using said intermediate coating composition, forming a non-tacky, anticorrosive protective intermediate coating on application to surfaces to be protected.

8. An anticorrosive finish coating composition substantially composed of 36.5 parts by weight of a 25% solution of a synthetic elastomeric copolymer of isobutene with approximately 2% of a diolefine selected from the group consisting of isoprene and butadiene in an aromatic white-spirit solvent,
13.0 parts by weight of a 70% solution of a synthetic resinous copolymer of cyclohexanone and methyl cyclohexanone in solvent naphtha,
7 parts by weight of titanium dioxide,
3 parts by weight of black iron oxide,
1 part by weight of carbon black,
8 parts by weight of talc,
10 parts by weight of barium sulfate,
2 parts by weight of activated silica,
0.14 parts by weight of sulfur,
0.36 parts by weight of lead peroxide,
0.45 parts by weight of active zinc oxide, and
19 parts by weight of an aromatic white-spirit solvent added as diluent, said components being intimately mixed with each other and uniformly and homogeneously distributed throughout said composition, said finish coating composition, on admixture of p-benzoquinone dioxime, within about 24 hours before using said finish coating composition, forming a non-tacky, anticorrosive protective finish coating on application to surfaces to be protected.

9. An anticorrosive finish coating composition substantially composed of 56 parts by weight of a 25% solution of a synthetic elastomeric copolymer of isobutene with approximately 2% of a diolefine selected from the group consisting of isoprene and butadiene in an aromatic white-spirit solvent,
20 parts by weight of a 70% solution of a synthetic resinous copolymer of cyclohexanone and methyl cyclohexanone in solvent naphtha,
15 parts by weight of an aluminum metal paste,
0.56 parts by weight of benzothiazole disulfide, and
9 parts by weight of an aromatic white-spirit solvent added as diluent, said components being intimately mixed with each other and uniformly and homogeneously distributed throughout said composition, said finish coating composition, on admixture of p-benzoquinone dioxime, within about 24 hours before using said finish coating composition, forming a non-tacky, anti-corrosive protective finish coating on application to surfaces to be protected.

10. An anticorrosive finish coating composition substantially composed of 58 parts, by weight, of a 25% solution of a synthetic elastomeric copolymer of isobutene with approximately 2% of a diolefine selected from the group consisting of isoprene and butadiene in an aromatic white-spirit solvent,
11 parts by weight of titanium dioxide,
0.4 part by weight of carbon black,
4 parts by weight of activated silica,
0.21 part by weight of sulfur,
0.58 part by weight of lead peroxide,
0.73 part by weight of active zinc oxide, and
25 parts by weight of an aromatic white-spirit solvent added as diluent, said components being intimately mixed with each other and uniformly and homogeneously distributed throughout said composition, said finish coating composition, on admixture of p-benzoquinone dioxime, within about 24 hours before using said finish coating composition, forming a non-tacky, anticorrosive protective finish coating on application to surfaces to be protected.

11. Anticorrosive, protective painting and coating composition comprising a synthetic elastomeric copolymer of isobutene with approximately 2 percent of a diolefine selected from the group consisting of isoprene and butadiene, an accelerator for vulcanization of said elastomeric copolymer, said accelerator acting at room temperature, and a volatile organic solvent for said elastomeric copolymer, the boiling range of said solvent being between about 140° C. and about 200° C., said solvent being chemically inert and causing swelling and dissolution of the elastomeric copolymer, the components of said composition being uniformly and homogeneously distributed therethrough, said composition, on the addition, within about 24 hours before using the composition as paint, of a vulcanizing agent for vulcanization of said elastomeric copolymer, said vulcanizing agent acting at room temperature, forming a substantially non-tacky, anticorrosive, protective coating on application to surfaces to be protected, the elastomeric copolymer content of said composition being between about 2.5% and about 25% and its total solid content being between about 30% and about 80%.

12. Anticorrosive, protective painting and coating composition comprising a synthetic elastomeric copolymer of isobutene with approximately 2 percent of a diolefine selected from the group consisting of isoprene and butadiene, a pigment, a reinforcing agent, a filler material, an accelerator for vulcanization of said elastomeric copolymer, said accelerator acting at room temperature, and a volatile organic solvent for said elastomeric copolymer, the boiling range of said solvent being between about 140° C. and about 200° C., said solvent being chemically inert and causing swelling and dissolution of the elastomeric copolymer, the components of said composition being uniformly and homogeneously distributed therethrough, said composition, on the addition, within 24 hours before using the composition as paint, of a vulcanizing agent for vulcanization of said elastomeric copolymer, said vulcanizing agent acting at room temperature, forming a substantially non-tacky, anticorrosive, protective coating on application to surfaces to be protected, the elastomeric copolymer content of said composition being between about 2.5% and about 25% and its total solid content being between about 30% and about 80%.

13. Anticorrosive, protective painting and coating composition comprising a synthetic elastomeric copolymer of isobutene with approximately 2% of a diolefine selected from the group consisting of isoprene and butadiene, a synthetic resinous copolymer of cyclohexanone and methyl cyclohexanone, a pigment, a reinforcing agent, a filler material, a vulcanizing agent capable of reacting with said elastomeric copolymer at room temperature, and a volatile organic solvent for said elastomeric copolymer and said resinous copolymer, the boiling range of said solvent being between about 140° C. and 200° C., said solvent being chemically inert and causing swelling and dissolution of the elastomeric copolymer and the resinous copolymer, the components of said composition being uniformly and homogeneously distributed therethrough, said composition, on the addition, within about 24 hours before using the composition as paint, of an accelerator for vulcanization of said elastomeric copolymer, said accelerator acting at room temperature, forming a substantially non-tacky, anticorrosive, protective coating on application to surfaces to be protected, the proportion of said elastomeric copolymer to resinous copolymer not substantially exceeding a proportion of 1.0:2.5, the elastomeric copolymer content of said composition being between about 2.5% and about 25% and its total solid content being between about 30% and about 80%.

14. Anticorrosive, protective painting and coating composition comprising a synthetic elastomeric copolymer of isobutene with approximately 2% of a diolefine selected from the group consisting of isoprene and butadiene, a synthetic resinous copolymer of cyclohexanone and methyl cyclohexanone, an accelerator for vulcanization of said elastomeric copolymer, said accelerator acting at room temperature, and a volatile organic solvent for said elastomeric copolymer and said resinous copolymer, the boiling range of said solvent being between about 140° C. and about 200° C., said solvent being chemically inert and causing swelling and dissolution of said elastomeric copolymer and the resinous copolymer, the components of said composition being uniformly and homogeneously distributed therethrough, said composition, on the addition, within about 24 hours before using the composition as paint, of a vulcanizing agent for vulcanization of said elastomeric copolymer, said vulcanizing agent acting at room temperature, forming a substantially non-tacky, anticorrosive, protective coating on application to surfaces to be protected, the proportion of elastomeric copolymer to resinous copolymer not substantially exceeding a proportion of 1.0:2.5, the elastomeric copolymer content of said composition being between 2.5% and about 25% and its total solid content being between about 30% and about 80%.

15. Anticorrosive, protective painting and coating composition comprising a synthetic elastomeric copolymer of isobutene with approximately 2% of a diolefine selected from the group consisting of isoprene and butadiene, a synthetic resinous copolymer of cyclohexanone and methyl cyclohexanone, the proportion of elastomeric copolymer to resinous copolymer not substantially exceeding a proportion of about 1.0:2.5, a pigment, a reinforcing agent, a filler material, an accelerator for vulcanization of said elastomeric copolymer, said accelerator acting at room temperature, and a volatile organic solvent for said elastomeric copolymer and said resinous copolymer, the boiling range of said solvent being between about 140° C. and about 200° C., said solvent being chemically inert and causing swelling and dissolution of the elastomeric copolymer and the resinous copolymer, the components of said composition being uniformly and homogeneously distributed therethrough, said composition, on the addition, within about 24 hours before using the composition as paint, of a vulcanizing agent for vulcanization of said elastomeric copolymer, said vulcanizing agent acting at room temperature, forming a substantially non-tacky, anticorrosive, protective coating on application to surfaces to be protected, the elastomeric copolymer content of said composition being between about 2.5% and about 25% and its total solid content being between about 30% and about 80%.

16. In a process of providing an anticorrosive protective coating on surfaces to be protected against corrosion, the steps comprising uniformly and homogeneously admixing an accelerator for the vulcanization of a synthetic elastomeric copolymer of isobutene with approximately 2% of a diolefine selected from the group consisting of isoprene and butadiene, said accelerator acting at room temperature, to a composition comprising, as protective coating material, a synthetic elastomeric copolymer of isobuetene with approximately 2% of a diolefine selected from the group consisting of isoprene and butadiene, a vulcanizing agent acting at room temperature, and a volatile organic solvent for said elastomeric copolymer, the boiling range of said solvent being between about 140° C. and about 200° C., said solvent being chemically inert and causing swelling and dissolution of the elastomeric copolymer, the components of said composition being uniformly and homogeneously distributed therethrough, the elastomeric copolymer content of said composition being between about 2.5% and about 25% and its total solid content being between about 30% and about 80%, applying said mixture to the surface to be treated within about 24 hours after admixture of the vulcanization accelerator, and permitting the solvent to evaporate so as to form a non-tacky, anticorrosive protective coating on said surface.

17. In a process of providing an anticorrosive protective coating on surfaces to be protected against corrosion, the steps comprising uniformly and homogeneously admixing an accelerator for the vulcanization of a synthetic elastomeric copolymer of isobutene with approximately 2% of a diolefine selected from the group consisting of isoprene and butadiene, said accelerator acting at room temperature, to a composition comprising, as protective coating material, a synthetic elastomeric copolymer of isobutene with approximately 2% of a diolefine selected from the group consisting of isoprene and butadiene, a pigment, a reinforcing agent, a filler material, a vulcanizing agent acting at room temperature, and a volatile organic solvent for said elastomeric copolymer, the boiling range of said solvent being between about 140° C. and about 200° C., said solvent being chemically inert and causing swelling and dissolution of said elastomeric copolymer, the components of said composition being uniformly and homogeneously distributed therethrough, the elastomeric copolymer content of said composition being between about 2.5% and about 25% and its total solid content being between about 30% and about 80%, applying said mixture to the surface to be treated within about 24 hours after admixture of the vulcanization accelerator, and permitting the solvent to evaporate so as to form a non-tacky anticorrosive protective coating on said surface.

18. In a process of providing an anticorrosive protective coating on surfaces to be protected against corrosion, the steps comprising uniformly and homogeneously admixing an accelerator for the vulcanization of a synthetic elastomeric copolymer of isobutene with approximately 2% of a diolefine selected from the group consisting of isoprene and butadiene, said accelerator acting at room temperature, to a composition comprising as protective coating material, a synthetic elastomeric copolymer of isobutene with approximately 2% of a diolefine selected from the group consisting of isoprene and butadiene, a synthetic resinous copolymer of cyclohexanone and methyl cyclohexanone, a vulcanizing agent acting at room temperature, and a volatile organic solvent for said elastomeric copolymeric, the boiling range of said solvent being between about 140° C. and about 200° C., said solvent being chemically inert and causing swelling and dissolution of said elastomeric copolymer and the resinous copolymer, the components of said composition being uniformly and homogeneously distributed therethrough, the proportion of said elastomeric copolymer to resinous copolymer not substantially exceeding the proportion of about 1.0:2.5, the elastomeric copolymer content of said composition being between about 2.5% and about 25% and its total solid content being between about 30% and about 80%, applying said mixture to the surface to be treated within about 24 hours after admixture of the vulcanization accelerator, and permitting the solvent to evaporate so as to form a non-tacky anticorrosive protective coating on said surface.

19. In a process of providing an anticorrosive protective coating on surfaces to be protected against corrosion, the steps comprising uniformly and homogeneously admixing an accelerator for the vulcanization of a synthetic elastomeric copolymer of isobutene with approximately 2% of a diolefine selected from the group consisting of isoprene and butadiene, said accelerator acting at room temperature, to a composition comprising, as protective coating material, a synthetic elastomeric copolymer of isobutene with approximately 2% of a diolefine selected from the group consisting of isoprene and butadiene, a synthetic resinous copolymer of cyclohexanone and methyl cyclohexanone, a pigment, a reinforcing agent, a filler material, a vulcanizing agent acting at room temperature, and a volatile organic solvent for said elastomeric copolymer, the boiling range of said solvent being between about 140° C. and about 200° C., said solvent being chemically inert and causing swelling and dissolution of said elastomeric copolymer and resinous copolymer, the components of said composition being uniformly and homogeneously distributed therethrough, the proportion of said elastomeric copolymer to resinous copolymer not substantially exceeding a proportion of about 1.0:2.5, the elastomeric copolymer content of said composition being between about 2.5% and about 25% and its total solid content being between about 30% and about 80%, applying said mixture to the surface to be treated within about 24 hours after admixture of the vulcanization accelerator, and permitting the solvent to evaporate so as to form an anticorrosive protective coating on said surface.

References Cited by the Examiner

UNITED STATES PATENTS

| | | | |
|---|---|---|---|
| 2,775,537 | 12/1956 | Wilson et al. | 260—33.6 |
| 2,881,096 | 4/1959 | Kisbany | 260—33.6 XR |
| 2,992,200 | 7/1961 | Maly | 260—33.6 |

OTHER REFERENCES

Ellis, "Chemistry of Synthetic Resins," pp. 557 and 558, Rheinhold Pub. Company (1935).

Whitby, "Synthetic Rubber," pub. 1954 by Wiley & Sons, pp. 853 and 867–868.

Stern, "Rubber: Natural and Synthetic," pub. 1954 by Maclaren & Sons Ltd., London, page 334.

"Modern Plastics," vol. 25, Aug. 1948, pp. 119–20.

ALEXANDER H. BRODMERKEL, *Primary Examiner.*

LEON J. BERCOVITZ, DANIEL ARNOLD, *Examiners.*